US012711790B2

(12) United States Patent
Fashandi et al.

(10) Patent No.: US 12,711,790 B2
(45) Date of Patent: Aug. 18, 2026

(54) ARTIFICIAL INTELLIGENCE DEVICE FOR HARVESTING DATA FROM UNLABELED SOURCES AND CONTROL METHOD THEREOF

(71) Applicant: LG ELECTRONICS INC., Seoul (KR)

(72) Inventors: Homa Fashandi, Toronto (CA); Sen Jia, Markham (CA)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 18/439,442

(22) Filed: Feb. 12, 2024

(65) Prior Publication Data

US 2024/0290119 A1 Aug. 29, 2024

Related U.S. Application Data

(60) Provisional application No. 63/444,602, filed on Feb. 10, 2023.

(51) Int. Cl.
*G06V 20/70* (2022.01)
*G06V 10/774* (2022.01)
*G06V 10/82* (2022.01)

(52) U.S. Cl.
CPC ............ *G06V 20/70* (2022.01); *G06V 10/774* (2022.01); *G06V 10/82* (2022.01)

(58) Field of Classification Search
CPC ....... G06V 20/70; G06V 10/774; G06V 10/82
See application file for complete search history.

(56) References Cited

FOREIGN PATENT DOCUMENTS

CN 113554129 A * 10/2021 ............. G06F 18/22

OTHER PUBLICATIONS

Kenigsfield, TranstextNet: Transducing Text for Recognizing Unseen Visual Relationships, 2021 IEEE Winter Conference on Applications of Computer Vision (WACV) (Year: 2021).*
Zhong, Learning to Generate Scene Graph from Natural Language Supervision, Proceedings of the IEEE/CVF International Conference on Computer Vision, 2021 (Year: 2021).*

(Continued)

*Primary Examiner* — Vu Le
*Assistant Examiner* — Lei Zhao
(74) *Attorney, Agent, or Firm* — Birch, Stewart, Kolasch & Birch, LLP

(57) ABSTRACT

A method for controlling an artificial intelligence (AI) device can include receiving, via a processor, a base dataset, and receiving, via the processor, an image that is unlabeled. Also, the method can include inputting the image to at least one of a caption-based pipeline and a data programming pipeline to generate a labeled image training data sample including triplet information, the caption-based pipeline including a matching model configured to receive textual scene graph information for the image and bounding box information for the image, and the data programming pipeline including a feature extraction model configured to output three vectors and a label generator configured to receive the three vectors. The method can further include in response to the predicate matching a same predicate in a tail distribution of the base dataset, merging the labeled image training data sample with the base dataset to generate an enhanced dataset.

23 Claims, 16 Drawing Sheets

(56) References Cited

OTHER PUBLICATIONS

Xu, Scene Graph Generation by Iterative Message Passing, Proceedings of the IEEE conference on computer vision and pattern recognition, 2017 (Year: 2017).*
Lu, Visual Relationship Detection with Language Priors, European conference on computer vision, 2016 (Year: 2016).*
Hung, Contextual Translation Embedding for Visual Relationship Detection and Scene Graph Generation, IEEE Transactions On Pattern Analysis and Machine Intelligence, vol. 43, No. 11, Nov. 2021 (Year: 2021).*
Ratner, Data Programming: Creating Large Training Sets, Quickly, Advances in neural information processing systems, 2016 (Year: 2016).*
Alexander Ratner et al. "Data Programming: Creating Large Training Sets, Quickly", 2016, 30th Conference on Neural Information Processing Systems (2016), pp. 1-9.
Alexander Ratner et al. "Snorkel: rapid training data creation with weak supervision", The VLDB Journal (2020), vol. 29, pp. 709-730.
Boris Knyazev et al. "Generative Compositional Augmentations for Scene Graph Prediction", 2021, This ICCV paper is the Open Access Version, provided by the Computer Vision Foundation, pp. 15827-15837.
Boris Knyazev et al. "Graph Density-Aware Losses for Novel Compositions in Scene Graph Generation" , 2020, pp. 1-14.
Danfei Xu et al. "Scene Graph Generation by Iterative Message Passing", 2017, This CVPR is the Open Access version, providede by the Computer Vision Foundation, pp. 5410-5419.
He Huang et al. "Addressing Class Imbalance in Scene Graph Parsing by Learning to Contrast and Score", 2020, This ACCV, provided by the Computer Vision Foundation, is the author-created version, pp. 1-17.
Ji Zhang et al. "Graphical Contrastive Losses for Scene Graph Parsing", 2019, This CVPR paper is the Open Access version, provided by the Computer Vision Foundation, pp. 11535-11543.
Kalhua Tang et al. "Unbiased Scene Graph Generation from Biased Training", This CVPR 2020 paper is the Open Access version, provided by Computer Vision Foundation, pp. 3716-3725.
Rongjie Li et al. "Bipartite Graph Network with Adaptive Message Passing for Unbiased Scene Graph Generation", This CVPR 2021 paper is the Open Access version, provided by the Computer Vision Foundation, pp. 11109-11119.
Vincent S. Chen et al. "Scene Graph Prediction with Limited Labels", 2019, This ICCV is the Open Access version, provided by the Computer Vision Foundation, pp. 2580-2590.
Yiwu Zhong et al. "Learning to Generate Scene Graph from Natural Language Supervision", 2021, This ICCV paper is the Open Access version, provided by the Computer Vision Foundation, pp. 1823-1834.

* cited by examiner

| | | |
|---|---|---|
| a cat is sitting on top of the suitcase | two poeple walking into the ocean with surfboards | a man is sitting on a bench next to a fire hydrant |
| <cat, sit, suitcase> | <poeple, walk, ocean>, <poeple, walk, ocean>, <ocean, with, surfboard> | <man, sit, bench>, <man, sit, fire hydrant> |

Captions predicates

VG200 predicates

FIG. 10
surfboard
table
side
couch
track
pizza
umbrella
plate
people
water
cat
grass
group
skateboard
kitchen
woman
train
bathroom
food
man
field
giraffe
street
building
snow
room
dog
bed
street sign
city street
person
laptop computer
train
elephant
fence
woman
dog
building
zebra
window
glass
man
person
giraffe
food
cat
tail

Captions objects

VG200 objects

FIG. 15

<woman, sitting on , bench>,<bench, holding, jacket>

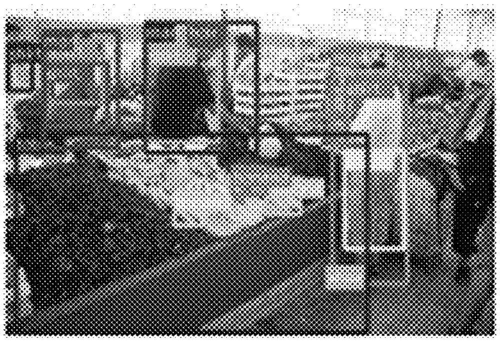

<short, on , man> , <banana, on, table>, <man, wearing, shirt> , <man, with, hair>, <table, on, banana> , <shirt, on, table>

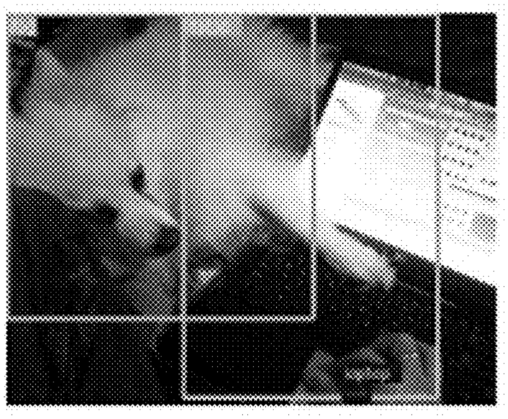

<dog, playing, laptop>, <laptop, with, person>

<laptop, has, screen>, <hand, on, laptop>, <laptop, on, table>, <screen, on, laptop>, <eye, on, nose>, <nose, has, eye>

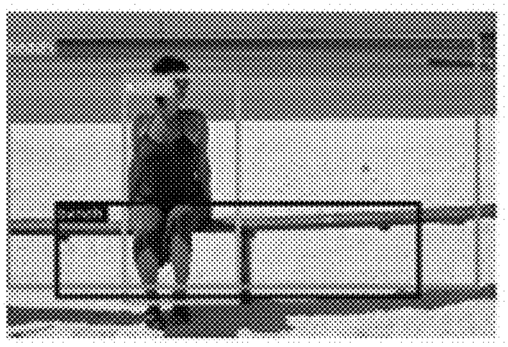

<woman, sitting on, beach>, <bench, on, beach>

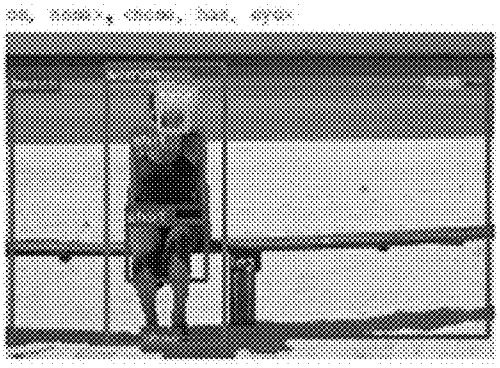

<glass, on , woman>, <glass, in front of, face>, <woman, wears, shirt>, <leg, of, bench>, <short, on, beach>, <glass, on, beach>

ARTIFICIAL INTELLIGENCE DEVICE FOR HARVESTING DATA FROM UNLABELED SOURCES AND CONTROL METHOD THEREOF

CROSS-REFERENCE TO RELATED APPLICATIONS

This non-provisional application claims priority under 35 U.S.C. § 119(e) to U.S. Provisional Application No. 63/444,602, filed on Feb. 10, 2023, the entirety of which is hereby expressly incorporated by reference into the present application.

BACKGROUND

Field

The present disclosure relates to a device and method for harvesting data from unlabeled sources, in the field of artificial intelligence (AI). Particularly, the method can provide training data from unlabeled sources for improving scene graph generation and other related downstream tasks, in the AI field.

Discussion of the Related Art

Artificial intelligence (AI) continues to transform various aspects of society and helps users more efficiently retrieve and interact with information whether in the form of computer vision applications, question and answering systems or recommendations systems.

While AI has revolutionized various fields, additional transparency and modularity is desired, which can be aided by abstraction, in which data is transformed into semantic concept-based representation. For example, scene graphs (SG) can help achieve such abstraction in computer visual applications and related tasks.

A scene graph (SG) is a structured representation of the visual content of an image or video. It captures the objects, relationships, and attributes present in the scene, providing a semantic understanding of the visual world. Scene Graph Generation (SGG) is the task of generating such graphs from input images. Building such models requires extensive annotated data both at the object level (e.g., bounding boxes and the class labels) and at the relationship level between pairs of objects (e.g., subject, predicate, object).

For instance, SGs are often constructed based on a process of detailed annotation, where humans, e.g., subject matter experts (SMEs), manually identify and label the objects, relationships, and attributes in an image or video. This annotation process is often time-consuming, very costly and requires expertise in visual understanding and scene interpretation. Also, humans are often biased, and obvious or seemingly inherent spatial relationships in an image often go unnoticed or are not properly annotated, in which the amount of training data suffers from a long tail distribution.

The long-tail distribution poses a significant challenge for various machine learning tasks, especially since there is often a limited amount of properly labeled training data for these rare cases, and producing training data for these rare cases is time consuming and expensive. Also, better training data can be used to train a scene graph generator to produce more a detailed and accurate scene graph, which can be used in various computer vision applications, captioning systems and question and answering systems.

Accordingly, there exists a need for being able to harvest training data from unlabeled sources for improving scene graph generation and related downstream tasks, in a manner which can save time and reduce costs.

Also, a need exists for a modular AI solution that is scalable, reduces design time, improves transparency and explainability, and reduces training time, which can help accelerate the adoption of AI technologies across diverse fields and help foster further advancements in AI.

SUMMARY OF THE DISCLOSURE

The present disclosure has been made in view of the above problems and it is an object of the present disclosure to provide a device and method that can harvest data from unlabeled sources, in the field of artificial intelligence (AI). Further, the method can provide training data from unlabeled sources for improving scene graph generation and other related downstream tasks, in the field of artificial intelligence (AI).

An object of the present disclosure to is provide a method for controlling an artificial intelligence (AI) device that includes receiving a base dataset and an unlabeled image, then processing the image through either a caption-based (CB) pipeline or a data programming pipeline (DP), or both, to generate a labeled image training data sample, in which the caption-based pipeline incorporates a matching model analyzing textual scene graph information and bounding box details for the image, and the data programming pipeline utilizes a feature extraction model to output three vectors and a label generator to process these vectors, and subsequently, if the predicate for the labeled image training data sample generated by either of the pipelines matches a predicate in the tail distribution of the base dataset, the labeled image training data sample is combined with the base dataset to generate an enhanced dataset.

An object of the present disclosure to is provide a method for controlling an artificial intelligence (AI) device that includes receiving, via a processor in the AI device, a base dataset, receiving, via the processor, an image, the image being unlabeled, inputting, via the processor, the image to at least one of a caption-based pipeline and a data programming pipeline to generate a labeled image training data sample including triplet information, the caption-based pipeline including a matching model configured to receive textual scene graph information for the image and bounding box information for the image, and the data programming pipeline including a feature extraction model configured to output three vectors and a label generator configured to receive the three vectors, and in response to the predicate matching a same predicate in a tail distribution of the base dataset, merging the labeled image training data sample with the base dataset to generate an enhanced dataset.

Another object of the present disclosure is to provide a method for controlling an artificial intelligence (AI) device that includes in response to the predicate being different than all predicates in the tail distribution of the base dataset, discarding the labeled image training data sample.

An object of the present disclosure is to provide a method for controlling an artificial intelligence (AI) device that includes training, via the processor, a scene graph generation model based on the enhanced dataset to generate a trained scene graph generation model, in which the trained scene graph generation model includes at least one trained neural network that is trained based on the enhanced dataset.

Another object of the present disclosure is to provide a method for controlling an artificial intelligence (AI) device that includes inputting the image to an image captioning model in the caption-based pipeline, outputting, via the image captioning model, a sentence corresponding to a caption for the image, inputting the sentence to a textual scene graph generation (SGG) model in the caption-based pipeline, outputting, via the SGG model, textual scene graph information for the sentence corresponding to the image, inputting the image to an object detector in the caption-based pipeline, outputting, via the object detector, bounding box information and label information for the image, inputting the textual scene graph information, the bounding box information and the label information to a matching model, and matching or converting, via the matching model, a word within at least one of the textual scene graph information, the bounding box information and the label information to a same word included in a vocabulary of the base dataset for generating the labeled image training data sample, the second algorithm being different than the first algorithm.

Yet another object of the present disclosure is to provide a method for controlling an artificial intelligence (AI) device, in which the matching model uses a first algorithm for matching or converting predicates within the at least one of the textual scene graph information, the bounding box information and the label information to correspond to predicates found in the base dataset, and the matching model uses a second algorithm for matching or converting objects within the at least one of the textual scene graph information, the bounding box information and the label information to correspond to objects found in the base dataset.

An object of the present disclosure is to provide a method for controlling an artificial intelligence (AI) device, in which the textual scene graph information includes nodes corresponding objects in the image and edges corresponding to relationships between the objects in the image.

Another object of the present disclosure is to provide a method for controlling an artificial intelligence (AI) device, in which the image captioning model is a pre-trained Meshed-Memory Transformer.

Yet another object of the present disclosure is to provide a method for controlling an artificial intelligence (AI) device, in which the object detector is a pre-trained Mask Region-based Convolutional Neural Network (Mask R-CNN).

An object of the present disclosure is to provide a method for controlling an artificial intelligence (AI) device, in which the tail distribution of the base dataset includes tail predicates, each of the tail predicates corresponding to a number of training samples that is less than a predetermined number.

An object of the present disclosure is to provide a method for controlling an artificial intelligence (AI) device that includes inputting the image to an object detector in the data programming pipeline, outputting, via the object detector, bounding box information and label information for the image, inputting the bounding box information and the label information to the feature extraction model, and outputting, via the feature extraction model, a spatial vector, a semantic vector and a visual vector.

An object of the present disclosure is to provide a method for controlling an artificial intelligence (AI) device that includes inputting the spatial vector, the semantic vector and the visual vector to the label generator in the data programming pipeline, and outputting, via the label generator, the labeled image training data sample based on the spatial vector, the semantic vector and the visual vector.

Another object of the present disclosure is to provide a method in which the label generator includes a group of weak classifiers configured to output labels for objects included in the image, a generative model configured to output a set of probabilistic training labels, and a discriminative model configured to output the labeled image training data sample based on the set of probabilistic training labels.

An object of the present disclosure is to provide a method for controlling an artificial intelligence (AI) device, in which spatial vector is generated based on a bounding box of a subject in the image, a bounding box of an object in the image, and a bounding box of a predicate that encloses the bounding box of the subject and the bounding box of the object, the semantic vector is generated based on a concatenation of two multi-dimensional embeddings of a label of the subject and a label of the object, and the visual vector is generated based on a convolutional neural network backbone (ConvNet) of the object detector followed by region of interest (ROI) align.

An object of the present disclosure is to provide an artificial intelligence (AI) device for harvesting labeled training data from unlabeled sources, which includes a memory configured to store a base dataset, and a controller configured to receive an image, the image being unlabeled, input the image to at least one of a caption-based pipeline and a data programming pipeline to generate a labeled image training data sample including triplet information, the caption-based pipeline including a matching model configured to receive textual scene graph information for the image and bounding box information for the image, and the data programming pipeline including a feature extraction model configured to output three vectors and a label generator configured to receive the three vectors, and in response to the predicate matching a same predicate in a tail distribution of the base dataset, merge the labeled image training data sample with the base dataset to generate an enhanced dataset.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

FIG. 15 illustrates example harvested triplets of images according to the caption-based (CB) approach, and example harvested triplets of images according to the data-programming (DP) approach, according to an embodiment of the present invention.

DETAILED DESCRIPTION OF THE EMBODIMENTS

Figure 1:
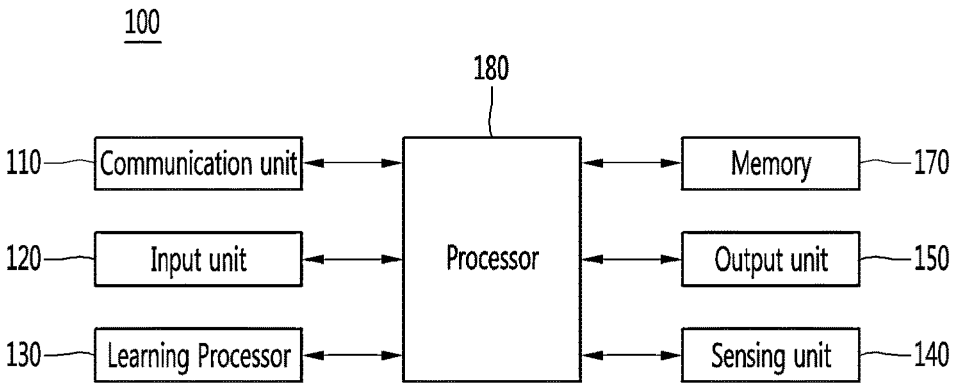
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which can be implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100*a* to 100*e* and the AI server 200 (e.g., FIGS. 2 and 3) by using wire/wireless communication technology. For example, the communication unit 110 can transmit and receive sensor information, a user input, a learning model, and a control signal to and from external devices.

The communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using a learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to infer a result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

At this time, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can evaluate logic rules for a question and answering system or a recommendation system, or use training data to train a screen graph generator to provide a scene graph which can used for various computer vision tasks, such as visual question answers, robot control, self-driving etc. Also, processor 180 can harvest data from unlabeled sources for improving scene graph generation.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine an answer or a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI device 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 to drive an application program stored in memory 170. Furthermore, the processor 180 can operate two or more of the components included in the AI device 100 in combination to drive the application program.

Figure 2:
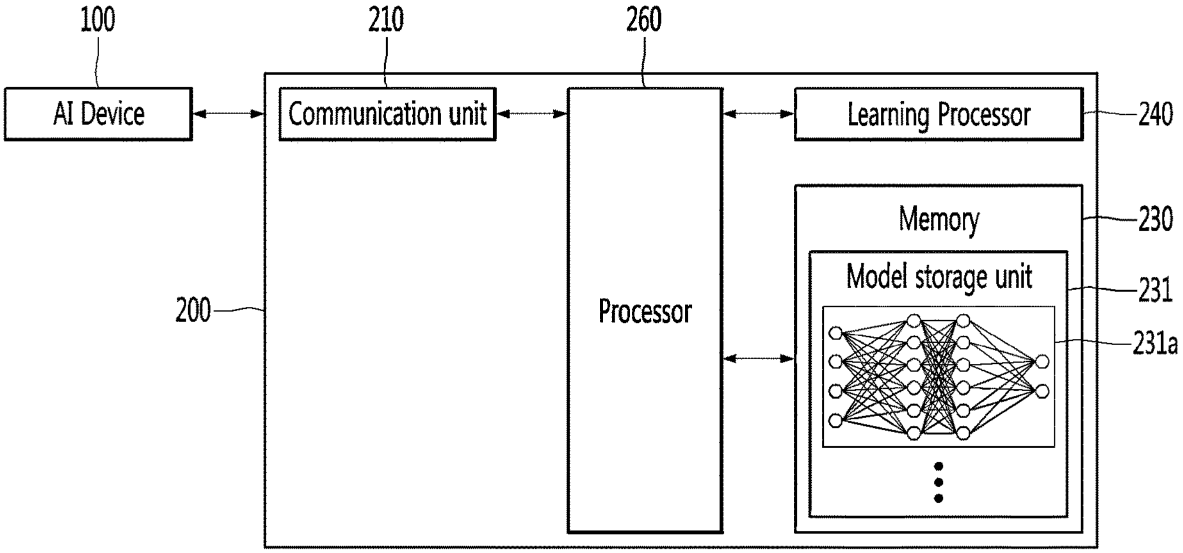
FIG. 2 illustrates an AI server according to an embodiment of the present disclosure.

FIG. 2 illustrates an AI server according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231*a*) through the learning processor 240.

The learning processor 240 can learn the artificial neural network 231*a* by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in the memory 230.

The processor 260 can infer the result value for new input data by using the learning model and can generate a response or a control command based on the inferred result value.

Figure 3:
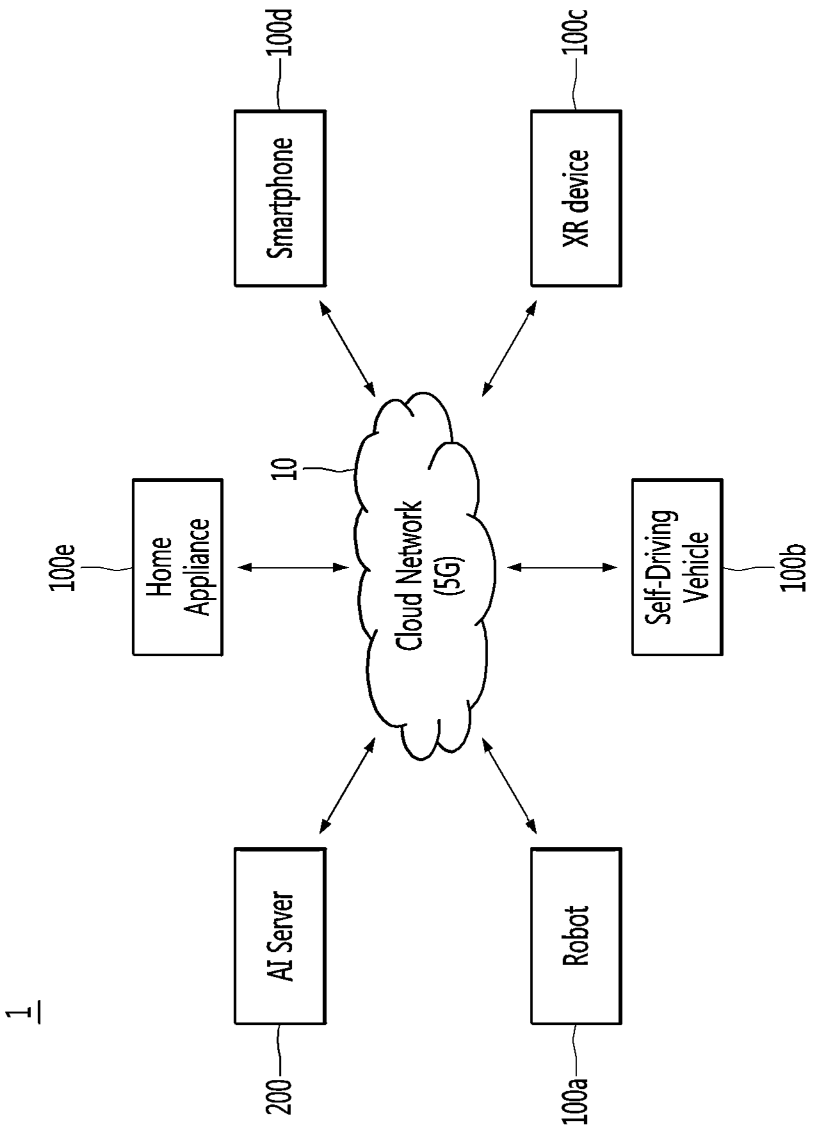
FIG. 3 illustrates an AI device according to an embodiment of the present disclosure.

FIG. 3 illustrates an AI system 1 including a terminal device according to one embodiment.

Referring to FIG. 3, in the AI system 1, at least one of an AI server 200, a robot 100*a*, a self-driving vehicle 100*b*, an XR (extended reality) device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*. The AI server 200 of FIG. 3 can have the configuration of the AI server 200 of FIG. 2.

According to an embodiment, the evaluation method can be implemented as an application or program that can be downloaded or installed in the smartphone 100*d*, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100*a* to 100*e* and 200 configuring the AI system 1 can be connected to each other through the cloud network 10. In particular, each of the devices 100*a* to 100*e* and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

At this time, the AI server 200 can learn the artificial neural network according to the machine learning algorithm instead of the AI devices 100*a* to 100*e*, and can directly store the learning model or transmit the learning model to the AI devices 100*a* to 100*e*.

At this time, the AI server 200 can receive input data from the AI devices 100*a* to 100*e*, can infer the result value for the received input data by using the learning model, can generate a response or a control command based on the inferred result value, and can transmit the response or the control command to the AI devices 100*a* to 100*e*. Each AI device 100*a* to 100*e* can have the configuration of the AI device 100 of FIGS. 1 and 2 or other suitable configurations.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 can be regarded as a specific embodiment of the AI device 100 illustrated in FIG. 1.

According to an embodiment, the home appliance 100*e* can be a smart television (TV), smart microwave, smart oven, smart refrigerator or other display device, which can implement one or more of an a scene graph generator, a computer vision application, a question and answering system or a recommendation system. The method can be the form of an executable application or program.

The robot 100*a*, to which the AI technology is applied, can be implemented as an entertainment robot, a guide robot, a carrying robot, a cleaning robot, a wearable robot, a pet robot, an unmanned flying robot, or the like.

The robot 100*a* can include a robot control module for controlling the operation, and the robot control module can refer to a software module or a chip implementing the software module by hardware.

The robot 100*a* can acquire state information about the robot 100*a* by using sensor information acquired from various kinds of sensors, can detect (recognize) surrounding environment and objects, can generate map data, can determine the route and the travel plan, can determine the response to user interaction, or can determine the operation.

The robot 100*a* can use the sensor information acquired from at least one sensor among the lidar, the radar, and the camera to determine the travel route and the travel plan.

The robot 100*a* can perform the above-described operations by using the learning model composed of at least one artificial neural network. For example, the robot 100*a* can recognize the surrounding environment and the objects by using the learning model, and can determine the operation by using the recognized surrounding information or object information. The learning model can be learned directly from the robot 100*a* or can be learned from an external device such as the AI server 200.

At this time, the robot 100*a* can perform the operation by generating the result by directly using the learning model, but the sensor information can be transmitted to the external device such as the AI server 200 and the generated result can be received to perform the operation.

The robot 100*a* can use at least one of the map data, the object information detected from the sensor information, or the object information acquired from the external apparatus to determine the travel route and the travel plan, and can control the driving unit such that the robot 100*a* travels along the determined travel route and travel plan. Further, the robot 100*a* can determine an action to pursue or an item to recommend. Also, the robot 100*a* can generate an answer in response to a user query. The answer can be in the form of natural language.

The map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/interaction of the user. At this time, the robot 100*a* can acquire the intention information of the interaction due to the user's operation or speech utterance, and can determine the response based on the acquired intention information, and can perform the operation.

The robot 100*a*, to which the AI technology and the self-driving technology are applied, can be implemented as a guide robot, a carrying robot, a cleaning robot (e.g., an automated vacuum cleaner), a wearable robot, an entertainment robot, a pet robot, an unmanned flying robot (e.g., a drone or quadcopter), or the like.

The robot 100*a*, to which the AI technology and the self-driving technology are applied, can refer to the robot itself having the self-driving function or the robot 100*a* interacting with the self-driving vehicle 100*b*.

The robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a common sensing method to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations interworking with the self-driving function of the self-driving vehicle 100*b* or interworking with the user who rides on the self-driving vehicle 100*b*.

In addition, the robot 100*a* interacting with the self-driving vehicle 100*b* can control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* can monitor the user boarding the self-driving vehicle 100*b*, or can control the function of the self-driving vehicle 100*b* through the interaction with the user. For example, when it is determined that the driver is in a drowsy state, the robot 100*a* can activate the self-driving function of the self-driving vehicle 100*b* or assist the control of the driving unit of the self-driving vehicle 100*b*. The function of the self-driving vehicle 100*b* controlled by the robot 100*a* can include not only the self-driving function but also the function provided by the navigation system or the audio system provided in the self-driving vehicle 100*b*.

Alternatively, the robot 100*a* that interacts with the self-driving vehicle 100*b* can provide information or assist the function to the self-driving vehicle 100$b$ outside the self-driving vehicle 100$b$. For example, the robot 100$a$ can provide traffic information including signal information and the like, such as a smart signal, to the self-driving vehicle 100$b$, and automatically connect an electric charger to a charging port by interacting with the self-driving vehicle 100$b$ like an automatic electric charger of an electric vehicle.

According to another embodiment, the AI device 100 can be integrated into an infotainment system of the self-driving vehicle 100$b$, but embodiments are not limited thereto. Also, the AI device 100 can be integrated into an infotainment system of the manual or human-driving vehicle.

According to an embodiment, the AI device 100 can harvest training data from unlabeled sources for improving scene graph generation and related downstream tasks. Particularly, the AI device 100 can produce more training data samples for rare cases found in the long-tail distribution, which can help improve the recall rate, zero-shot recall rate, and mean recall rate among other improvements. This newly harvested data can be added to a base dataset and can improve performance of the SGG model.

Figure 4:
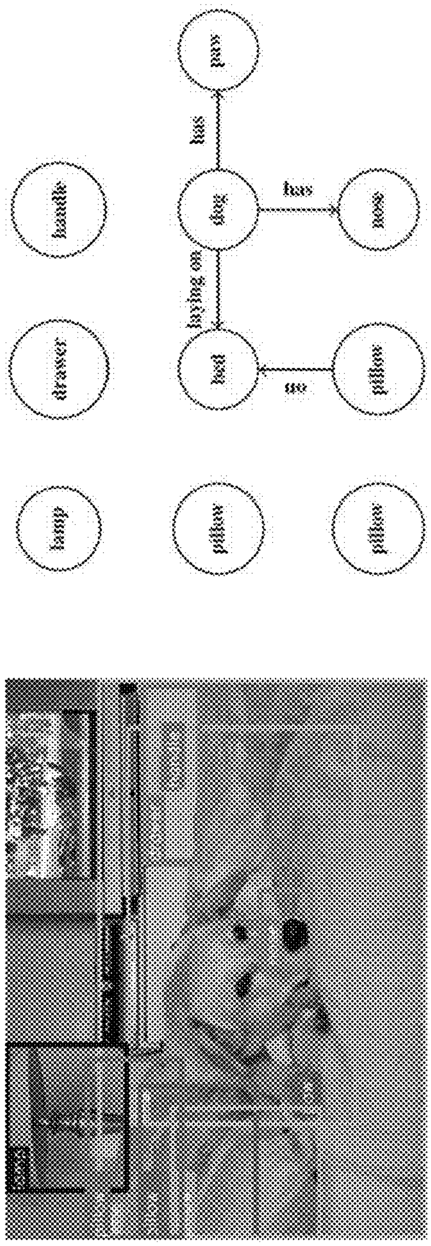
FIG. 4 illustrates an example of an annotated scene graph from an example base dataset, according to an embodiment of the present invention.

FIG. 4 shows an example of an annotated scene graph from the Visual Genome Dataset (e.g., VG200 split). However, other datasets can be used as a base dataset (e.g., the Stanford split etc.) and embodiments are not limited thereto.

A scene graph is a visually-grounded graph over object instances in an image, where the nodes correspond to entities (e.g., objects or subjects) in the image and the edges depict their pairwise relationships or predicates. It provides an abstract representation of the scene for added modularity and transparency.

The abstract representation of the scene enables the ability to perform symbolic or quasi-symbolic reasoning on the graph structure. Performing reasoning on this structure brings explainability to the reasoning process. Examples of such reasonings on the scene graph structure are visual question answering, image-captioning, image editing and retrieval, and visual grounding.

Similar to other real-life applications, scene graph generation (SGG) tasks often deal with imbalanced data. Moreover, the available data in this domain also suffers from missing links or noisy annotations. Part of the issue is that our visual world and how we describe it is biased. For example, rare cases found within the long-tail distribution are often overlooked or underrepresented.

For example, as shown in FIG. 4, the sample annotated scene graph has some missing links, e.g., there are three pillows are on the bed, but only one such triplet is annotated (e.g., <pillow, on, bed>). For instance, many relationships are not annotated, such as relationships between the lamp, the drawer and the handle. Spatial relationships between some objects may be deemed too benign or too obviously inherent by a human annotator and thus are not labeled when producing the training data.

Figure 5:
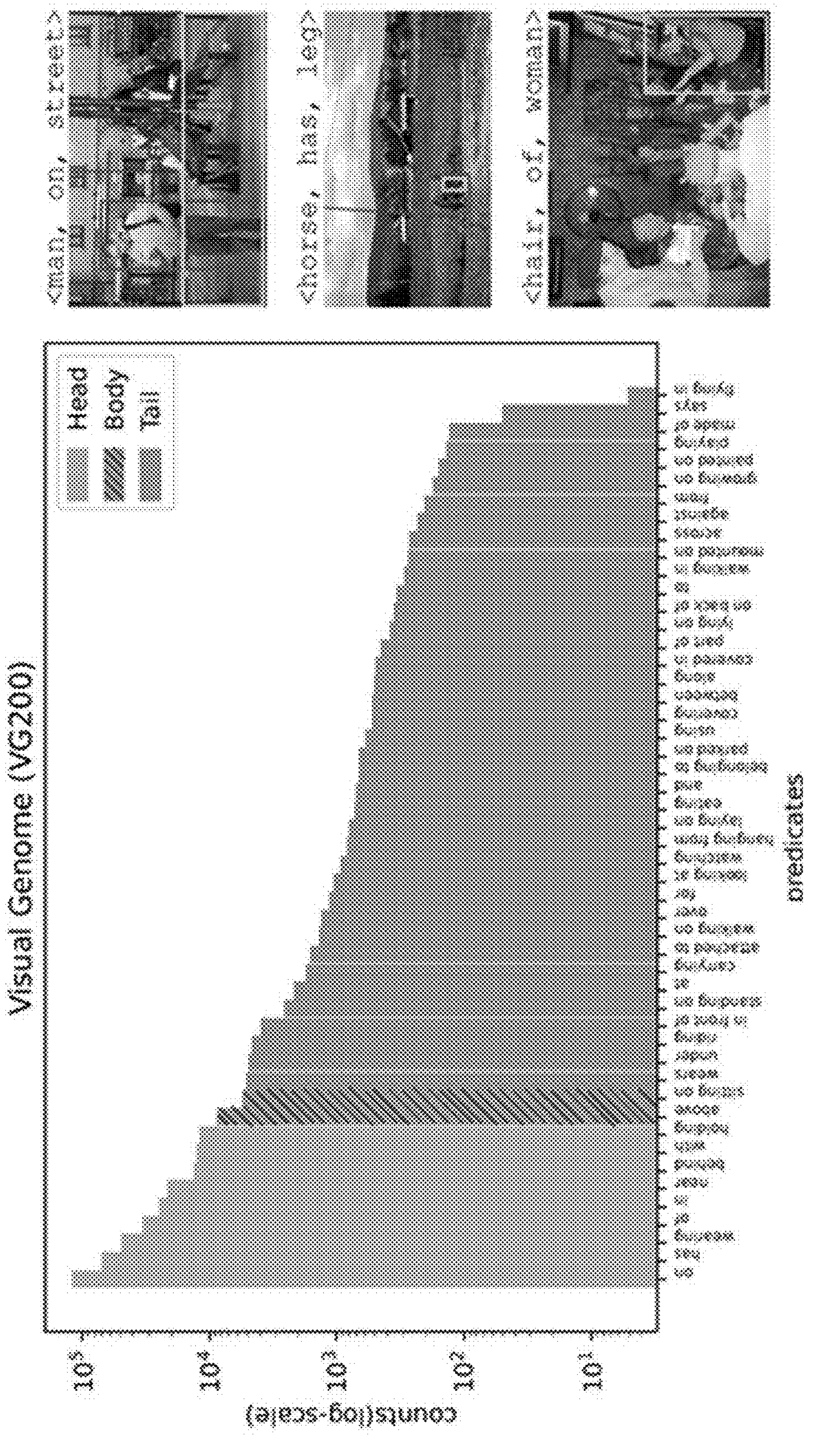
FIG. 5 illustrates predicates in the VG200 dataset as an example to illustrate issues regarding the long-tail distribution, according to an embodiment of the present invention.

FIG. 5 shows the number of each predicate in the VG200 dataset as an example to help illustrate issues regarding the long-tail distribution. In FIG. 5, the predicates (e.g., “on,” “has,” “over,” etc.) are disposed along the X-axis and the samples corresponding to each predicate are provided along the Y-axis in logarithmic scale.

In this example base dataset, there are 50 predicates and 150 object classes. Eleven predicates out of the fifty are in the head (e.g., n>10,000 samples) and body categories (e.g., 10,000≥n≥5,000), and the remaining predicates are located in the tail categories (e.g., n<5,000 samples).

Regarding FIG. 5, a model trained on such biased training data will learn the inherent bias which affects predictions, especially in the tail categories. In other words, a model trained on this data would be impaired due to the fewer amount of samples in the tail categories, versus the numerous amount of samples in the head and body categories. Thus, the long-tail distribution can be enhanced if more training data is gathered for these rare situations in the tail. However, as discussed above, providing more annotated training data for tail categories is often timing consuming and costly, especially when using human subject matter experts (SMEs).

According to an embodiment, the AI device 100 can harvest training data in the tail categories from unlabeled image sources. The AI device 100 can harvest training data from unlabeled sources using a caption based (CB) pipeline or a data programming (DP) pipeline.

According to another embodiment, the AI device 100 can harvest training data using both of the caption based (CB) and data programming (DP) pipelines to produce even more annotated training samples for the tail categories.

This harvested data can be merged with the original base dataset in order to create an enhanced dataset, which can be used to train a model, such as a scene graph generation (SGG) model and provide improved performance for various downstream applications.

Figure 6:
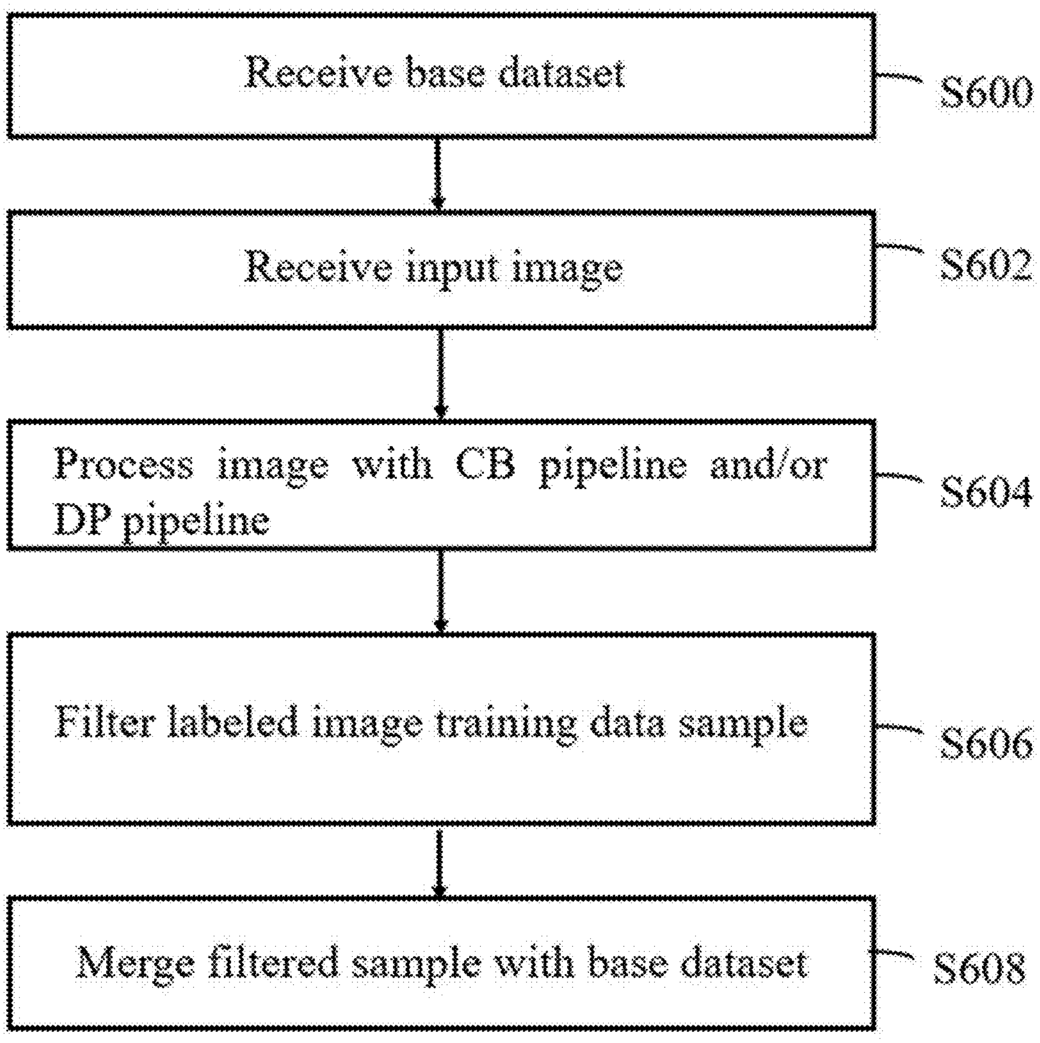
FIG. 6 shows an example flow chart for a method in the AI device 100, according to an embodiment of the present invention.

FIG. 6 shows an example flow chart of a method according to an embodiment. For example, the AI device 100 can be configured with a method that includes receiving a base dataset (e.g., S600), receiving an image that is unlabeled (e.g., S602), inputting the image to at least one of a caption-based pipeline and a data programming pipeline to generate a labeled image training data sample including triplet information (e.g., S604), filtering the labeled image training data sample based on whether it matches a same predicate in a tail distribution of the base dataset (e.g., S606), and merging the labeled image training data sample with the base dataset to generate an enhanced dataset (e.g., S608).

Figure 7:
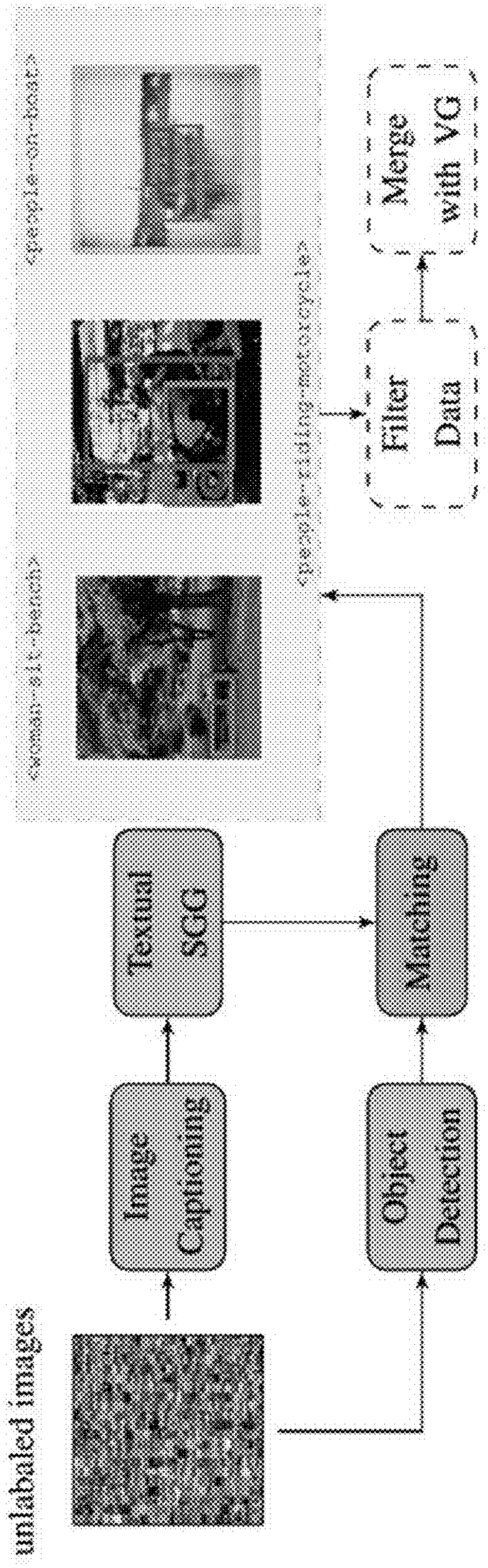
FIG. 7 illustrates components of the AI device 100 implementing a caption-based (CB) approach, according to an embodiment of the present disclosure.

FIG. 7 shows components of the AI device 100 implementing a caption-based (CB) approach, according to an embodiment.

For example, the caption-based approach can use a pre-trained object detector and a pre-trained captioning model. In FIG. 7, the components of the caption-based (CB) pipeline are shown in solid lined rectangles. These components can be either pre-trained deep learning models, e.g., object detector and image-captioning models, or natural language algorithms, e.g., textual SGG and the matching block.

Also, the matching block can perform a linking function for linking labeled images from the object detector with their corresponding triplets from the textual SGG, and the matching block can perform a converting/matching function for converting the label terms to the same words used in the base dataset. Regarding the linking process, each unlabeled image source can be assigned an identifier (ID) that can be passed through the pipeline along with the corresponding information that is generated along the way so that information generated based on that specific image can be associated with the corresponding ID and image.

For example, with reference to the upper path in the of the caption-based (CB) pipeline shown in FIG. 7, the image-captioning model can receive unlabeled images as an input, and the image-captioning model outputs sentences describing the scenes in the images. For example, an image of a woman sitting on a bench in the park may be captioned by the model as “a woman sitting on a beautiful chair.” Also, as discussed above, the same ID that was assigned to the input image can be associated with the sentence generated by the image-captioning model.

According to an embodiment, the image-captioning model can be a pre-trained Meshed-Memory Transformer, but embodiments are not limited thereto.

For example, the pre-trained Meshed-Memory Transformer (MMT) can combine visual features extracted from the input image with textual embeddings to generate descriptive captions. Through multiple layers of transformer blocks, the MMT architecture can utilize self-attention mechanisms to capture dependencies within the input sequences.

Further in this example, the "meshed-memory" component can aid in maintaining coherence and context across captions by storing and accessing information from previous processing steps. During caption generation, the model can predict each word autoregressively based on the joint encoding of visual and textual information, attending to relevant parts of the image features and previously generated words. While initially pre-trained on a large dataset, the MMT can be further fine-tuned on specific image-captioning datasets to adapt its parameters for generating coherent and contextually relevant captions for images, but embodiments are not limited thereto.

According to embodiments, different types of image-captioning models can be used according to design considerations.

The textual scene graph generator (SGG) model receives the captioned sentences from image-captioning model and generates a scene graph. The nodes of the scene graph can represent entities in the captioned sentences (e.g., objects and subjects), and the edges between the nodes can represent relations or predicates between those entities. The scene graph information generated by the SGG model can be transmitted to the matching block, which is described in more detail below.

Figure 8:
FIG. 8 illustrates examples of sample output from the captioning model and the textual scene graph generation (SGG) model, according to an embodiment of the present invention.

For example, FIG. 8 shows examples of samples output from the captioning model and the textual scene graph generator, in which the input image is at the top, the captioned sentence is located at the middle, and the scene graph is at the bottom.

Further in this example, with reference to the lower path in the of the caption-based pipeline shown in FIG. 7, the object detection model (e.g., object detector) can receive unlabeled images as an input, and outputs annotated images that include information for bounding boxes and their corresponding class labels. Also, as discussed above, the same ID that was assigned to the input image can be associated with annotated image produced by the object detector.

For example, the object detector can preprocess the input image (e.g., resizing, normalization, etc.), extract features using a convolutional neural network (e.g., CNN), such as shapes or patterns within the image, and identity regions of interest within the image (e.g., using object localization, a sliding window or region proposal methods), but embodiments are not limited thereto. Then, the object detector can predict bounding box coordinates for each region of interest (e.g., x and y coordinates, and its width and height).

Also, the object detector can perform classification to determine a class of category of the object contained within each bounding box. According to an embodiment, softmax activation can be used at the output layer of the CNN, where each class corresponds to a specific object category (e.g., man, woman, cat, food, chair, etc.), but embodiments are not limited thereto.

Further, the object detector can perform non-maximum suppression to remove redundant boxes. Then, the remaining bounding boxes along with their corresponding class labels can be output as the annotations for the image. These annotations can be visualized as bounding boxes overlaid on the original image, along with labels indicating the predicted object classes.

According to an embodiment, the object detector can be a pre-trained Mask R-CNN (Mask Region-based Convolutional Neural Network), but embodiments are not limited thereto. For example, the pre-trained Mask R-CNN can use a CNN backbone to extract hierarchical features from input images, and a Region Proposal Network (RPN) to propose candidate regions likely to contain objects, followed by ROI (Region of Interest) alignment to accurately extract features from these regions.

According to embodiments, different types of object detection models can be used according to design considerations.

With reference to FIG. 7 again, the annotated images including the bounding boxes and labels generated by the object detector can be input to the matching block along with their corresponding image IDs.

The matching block receives the textual scene graph information generated by the textual SGG model and the annotated images including the bounding boxes and labels generated by the object detector and can combined this information together. For example, the matching block can perform a linking operation to link the annotated images from the object detector with the corresponding nodes in the scene graph information based on the image IDs, but embodiments are not limited thereto. Other types of processes or matching functions can be used to link the annotated images from the object detector with the corresponding nodes in the scene graph information generated by the textual SGG according to design considerations.

In addition, a bounding box for the predicate can be calculated as a box that encloses both the object and the subject (e.g., a box enclosing two objects). According to an embodiment, the matching block (e.g., matching model or matcher) can link the bounding box for the predicate with the corresponding edge in the scene graph information.

Once the predicates and objects have be linked with the corresponding bounding boxes and the labeled images, these can constitute newly harvested, labeled training data samples. According to an embodiment, all of these training samples can be stored as their own training dataset or adding to a base dataset, but embodiments are not limited thereto. However, these newly harvested training samples will be distributed across the head, body and tail distribution and may not use the same terminology that is used by the base dataset.

In order to align the vocabulary in newly harvested training samples with the same vocabulary used by the base dataset, the matching block can perform a matching/converting operation for the objects and the predicates. According to an embodiment, the matching block can implement a rules based approach, which is explained in more detail below.

According to an embodiment, the matching block can effectively translate the terms used in the triplet information included in the generated scene graph information and labeled objects to match the same vocabulary used in the original base dataset. In other words, the vocabulary used by the image captioning model may be different than the vocabulary used in the original dataset.

For example, the vocabulary of the image captioning model may be much more diverse and needs to be simplified to match the same vocabulary used in the original dataset, which may be more limited. In this way, the harvested data can be later merged with the original base dataset in a seamless manner to create an enhance training dataset.

In order to match the vocabulary used in the original data set, the matching block either matches or converts the objects and the predicates to correspond to the same words used in the original data set. If matching or conversion cannot be properly carried out for a given training sample, then that training sample can be discarded.

For example, the image captioning model and the textual SGG may produce a triplet that includes the term "beautiful throne." However, the original dataset might not have any training samples that use the object term "beautiful throne." In this situation, the matching block can change the term "beautiful throne" to similar term or word that is found in the original dataset, such as "chair."

Also, if a strong match can not be obtained for a given sample, then it may be discarded, since merging that sample with the original data set may not be operable.

In order to improve accuracy, the AI device 100 can use two different algorithms for matching objects and for matching predicates, but embodiments are not limited thereto. For example, according to another embodiment, the AI device 100 can use a same matching algorithm for both objects and predicates.

Figure 9:
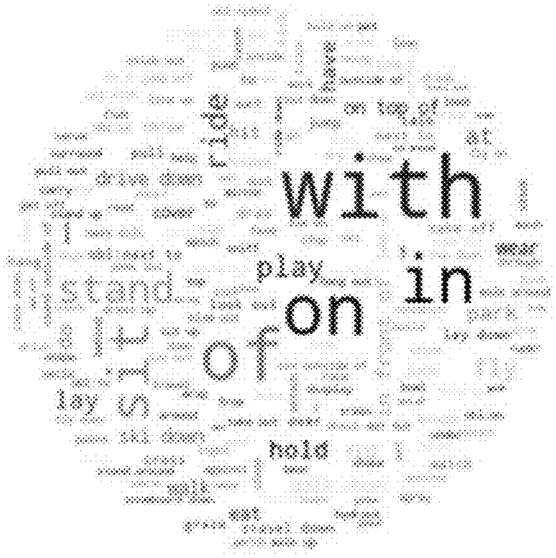
FIG. 9 illustrates an example word cloud for predicates output by the SGG model and a smaller word cloud that corresponds to the predicates used by the original base dataset, according to an embodiment of the present disclosure.
Figure 9:

According to an embodiment, Algorithm 1 below shows an example predicate matching algorithm that can be used for matching or converting predicates (e.g., relationship words) output by textual SGG model to correspond to the same type of words that are used in the original dataset. For example, FIG. 9 shows an example word cloud for predicates output by the SGG model and a smaller word cloud that corresponds to the predicates used by the original dataset (e.g., the image captioning model has a larger vocabulary than the base dataset).

Algorithm 1: Caption-based Pipeline: Matching Predicates

Data: $w_s \in V_{source}$, $V_{target}$, $t_1, t_2 \in (0, 1)$, $R \subset CN_{rels}$
Result: $w_t \in V_{target}$ or None
1 if $w_s \in V_{target}$ then
2 | return $w_s$
3 else
| /* return best matches & similarity values for wn and glove-based functions */
4 | $w_{wn}$, $sim_{wn} = f_{wn}(w_s, V_{target})$;
5 | $w_{glove}$, $sim_{glove} = f_{glove}(w_s, V_{target})$;
| /* return the shortest word to the related words to $w_s$ from Concept Net */
6 | $w_{related} = f_{cn}(w_s, R) = \{w \backslash w \in CN \;\&\; wRw_s\}$
7 | $w_{cn} = \text{argmin}_l\, w_{related}$
8 | if $w_{cn} \in V_{target}$ then
9 | return $w_{cn}$
10 | else if $sim_{wn} > t_1$ then
11 | return $w_{wn}$
12 | else if $sim_{glove} > t_2$ then
13 | return $w_{glove}$
14 |_ return None As shown above, the matching predicates process (e.g., Algorithm 1) can receive inputs including a source word ($w_s$) that is included in a source vocabulary ($V_{source}$) (e.g., the words used by the image-captioning model), a target vocabulary ($V_{target}$) (e.g., the words used by the base dataset), a first threshold value ($t_1$) and a second threshold value ($t_2$) which can be predetermined values between 0 and 1 (e.g., 0.5 or 0.55, etc.), and a subset of relationship words (e.g., synonyms) within ConceptNet®.

Further in this example, at line 1, the matching predicates process first checks to see if the source word ($w_s$) (e.g., the predicate produced by the CB pipeline) matches a word found within the source vocabulary ($V_{source}$) (e.g., VG200), if so then the same source word ($w_s$) is returned and the matching/conversion process is complete for that item. Otherwise (e.g., else), the matching predicates process proceeds through operations at lines 4-7.

With reference to lines 4-7, the matching predicates process proceeds with using two functions, e.g., $f_{wn}$ is the wordNet-based similarity measure and $f_{glove}$ is the cosine distance between GloVe embeddings of the two words, in order to return the best matches for similar words and their corresponding similarity values.

For example, $f_{cn}$ ($w_s$, R) can be defined based on the ConceptNet (CN) knowledge graph, where $R \subset CN_{rels}$ is a subset of relationships in CN. Further, R={is_a, form_of, synonym, similar_to} for predicate-matchings. The $f_{cn}$ function finds all the related words that are similar to source word ($w_s$) with respect to R in CN and returns the shortest related word as a match (e.g., shortest synonym).

With reference to lines 8-14, the matching predicates process proceeds with a series of "if" and "else if" statements. At line 8, the matching predicates process checks if the shortest related word ($w_{cn}$) is found within the source vocabulary ($V_{source}$), if so then the shortest related word ($w_{cn}$) is returned and the matching/conversion process is complete for that item. Otherwise (e.g., else if), the matching predicates process proceeds with checking whether the best matching word found using the wordNet-based similarity measure is greater than the first threshold value ($t_1$), if so then the matching word found using the wordNet-based ($w_{wn}$) measure is returned and the matching/conversion process is complete for that item.

If a matched word is not returned via lines 8-11, then the matching predicates process further proceeds with checking whether the best matching word found using the GloVe-based similarity measure is greater than the second threshold value ($t_1$), if so then the best matching word ($w_{glove}$) found using the cosine distance between GloVe embeddings is returned and the matching/conversion process is complete for that item.

Lastly, if no strong match is found by the matching predicates process, then nothing is returned and that training sample can be discarded (e.g., line 14).

Also, Algorithm 1 is just one possible example for returning a best matching word that is found in the target vocabulary of the base dataset, and other matching processes can be used, according to embodiments. For example, according to another embodiment, the ordering of lines 10 and 12 can be reversed for the matching predicates process.

According to an embodiment, Algorithm 2 below shows an example object matching algorithm that can be used for matching or converting predicates (e.g., relationship words) output by textual SGG model to correspond to the same type of words that are used in the original dataset.

Algorithm 2: Caption-based Pipeline: Matching Objects

Data: $w_s \in V_{source}$, $V_{target}$, $t_3$, $t_4$, $R \subset CN_{rels}$
Result: $w_t \in V_{target}$ or None; /* may find or not find a match. */
1 if $w_s \in V_{target}$ then
2 | return $w_s$
3 else
| /* return best matches & similarity values for wn and glove-based functions */
4 | $w_{wn}$, $sim_{wn} = f_{wn}(w_s, V_{target})$;

-continued

Algorithm 2: Caption-based Pipeline: Matching Objects

```
5    | w_glove, sim_glove = ƒ_glove(w_s, V_target );
     | /* return the shortest word to the related words to w_s
     |    from CN                                              */
6    | w_related = ƒ_cn(w_s, R) = {w\w ∊ CN & wRw_s}
7    | w_cn = argmin_I w_related
8    | if w_cn ∊ V_target then
9    |     return w_cn
10   | else if sim_glove > t_3 then
11   |     return w_glove
12   | else if sim_wn > t_4 then
13   |     return w_wn
14   |_ return None
```

As shown above, the matching objects process (e.g., Algorithm 2) is similar to the matching predicates process (e.g., Algorithm 1), except that the ordering of lines 10 and 12 is reversed. Thus, redundant descriptions will not be fully repeated.

Figure 10:
FIG. 10 illustrates an example word cloud for objects output by the SGG model and a smaller word cloud that corresponds to the objects used by the original base dataset, according to an embodiment of the present disclosure.
Figure 10:

Also, FIG. 10 shows an example word cloud for objects output by the captioning model and the textual SGG model, and a smaller word cloud that corresponds to the objects used by the original dataset (e.g., the image captioning model has a larger vocabulary for objects than the base dataset).

For example, the matching objects process also finds the best matching words using the wordNet-based ($w_{wn}$) similarity measure and the GloVe-based similarity measure, and finds the shortest related word ($w_{cn}$) based on the ConceptNet (CN) knowledge graph where is R={is_a, synonym}.

However, the ordering of the series of "if" and "else if" statements can be different. For example, at line 8, the matching objects process checks if the shortest related word ($w_{cn}$) is found within the source vocabulary ($V_{source}$), if so then the shortest related word ($w_{cn}$) is returned and the matching/conversion process is complete for that item. Otherwise (e.g., else if), then the matching objects process proceeds with checking whether the best matching word found using the GloVe-based similarity measure is greater than the third threshold value ($t_3$), if so then the best matching word ($w_{glove}$) found using the cosine distance between GloVe embeddings is returned and the matching/conversion process is complete for that item.

If a matching word is not returned through the operations at lines 8-11, then the matching objects process further proceeds with checking whether the best matching word found using the wordNet-based similarity measure is greater than the fourth threshold value ($t_4$), if so then the matching word found using the wordNet-based ($w_{wn}$) measure is returned and the matching/conversion process is complete for that item.

Lastly, if no strong match is found by the matching objects process, then nothing is returned and that training sample can be discarded (e.g., line 14).

Also, Algorithm 2 is just one possible example for returning a best matching word that is found in the target vocabulary of the base dataset, and other matching processes can be used, according to embodiments. For example, according to another embodiment, different similarity measures or different orderings or rules can be used for finding related words for the matching objects process.

With reference to FIG. 7 again, the output of the matching block is annotated/labeled image training samples that have been converted/matched to use the same words/vocabulary that is used in the base dataset. However, these harvested data samples are distributed across the head, body and tail for the predicates, and a filtering step can used to select only those training samples that fall within the tail categories, in order to provide more samples for these rare situations.

For example, in FIG. 7, the filter can select only those training samples that have predicates that are located in the tail categories (e.g., n<5,000 samples), and the other samples that fall within the head and body can be discarded, but embodiments are not limited thereto. For example, if a harvested sample includes a same predicate word found within the tail, then it can be kept and added to the original dataset, otherwise it can be discarded.

According to another embodiment, the filtering step can be adjusted or omitted, and some or all of the harvested training samples that belong to the head and body categories can be added to the base dataset or used to create a new training dataset.

The filtered training samples selected from among the harvested training samples can be converted to the same format as the base dataset and merged together with the base dataset, in order to produce an enhanced dataset that has an improved tail distribution.

Figure 11A:
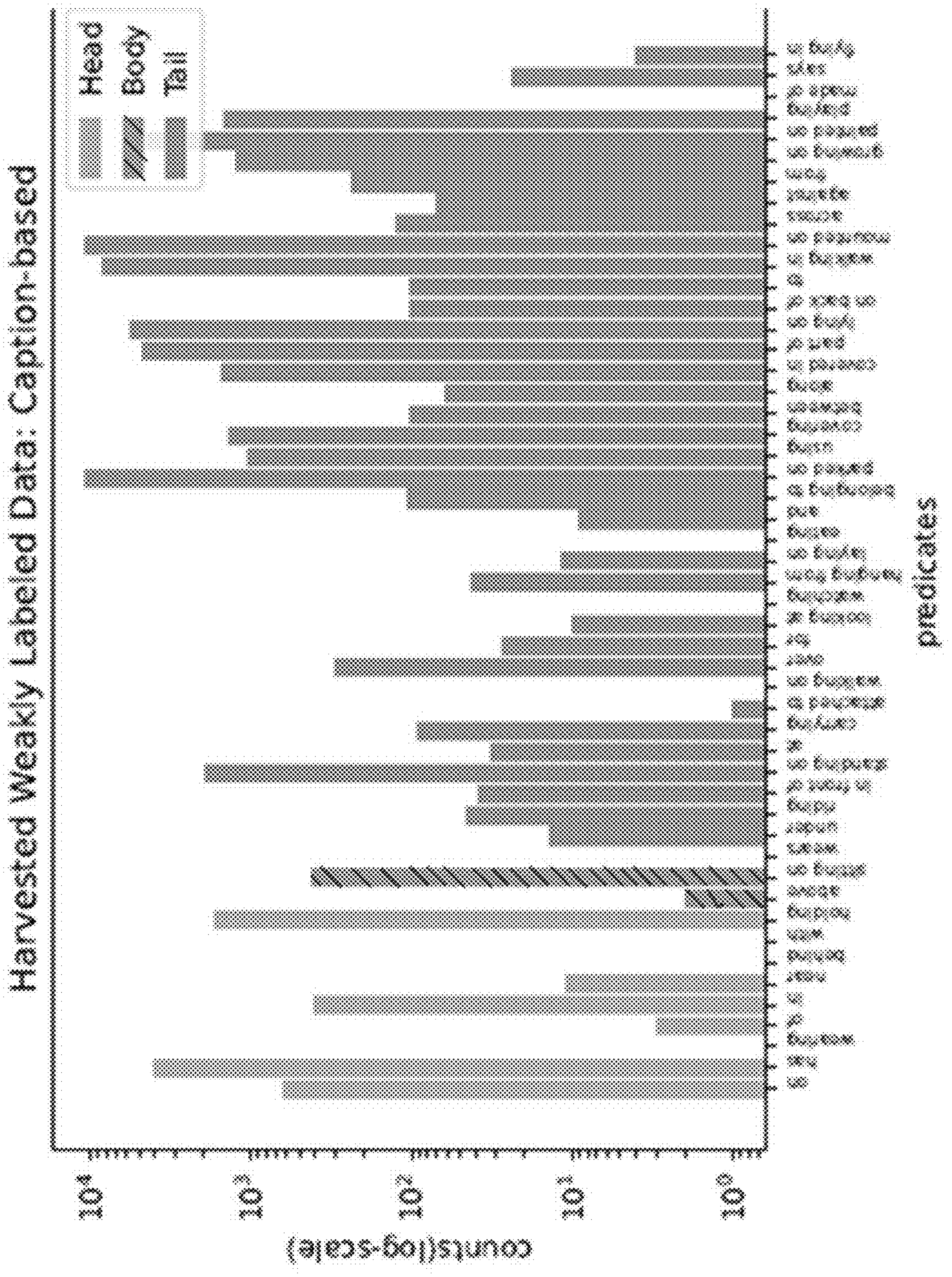
FIG. 11A illustrates example statistics of the harvested training data samples according to a caption-based (CB) approach, according to an embodiment of the present invention.
Figure 11B:
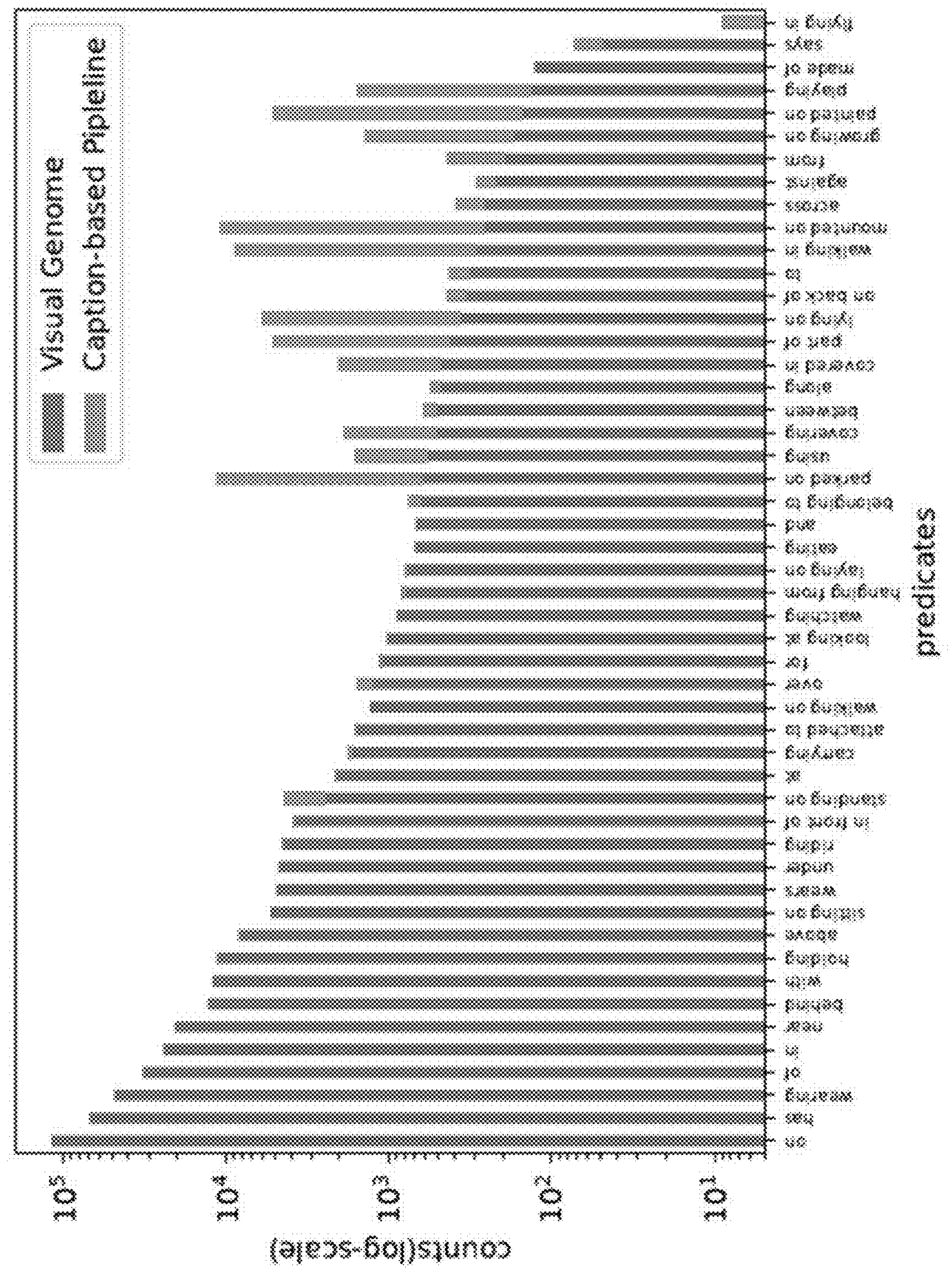
FIG. 11B illustrates example statistics of training data samples from the CB approach merged with the base dataset which have been added to the tail categories to generate an enhanced dataset, according to an embodiment of the present invention.

FIG. 11A shows example statistics of the harvested data according to the caption-based (CB) approach, and FIG. 11B shows an example of those training samples merged with the base dataset which have been added to the tail categories to generate an enhanced dataset. In this way, the caption-based (CB) approach can automatically generate new triplet training samples from unlabeled image sources in a manner that saves time and reduces costs, and enhances the rare tail categories, which can improve recall rates and accuracy for downstream tasks.

Figure 12:
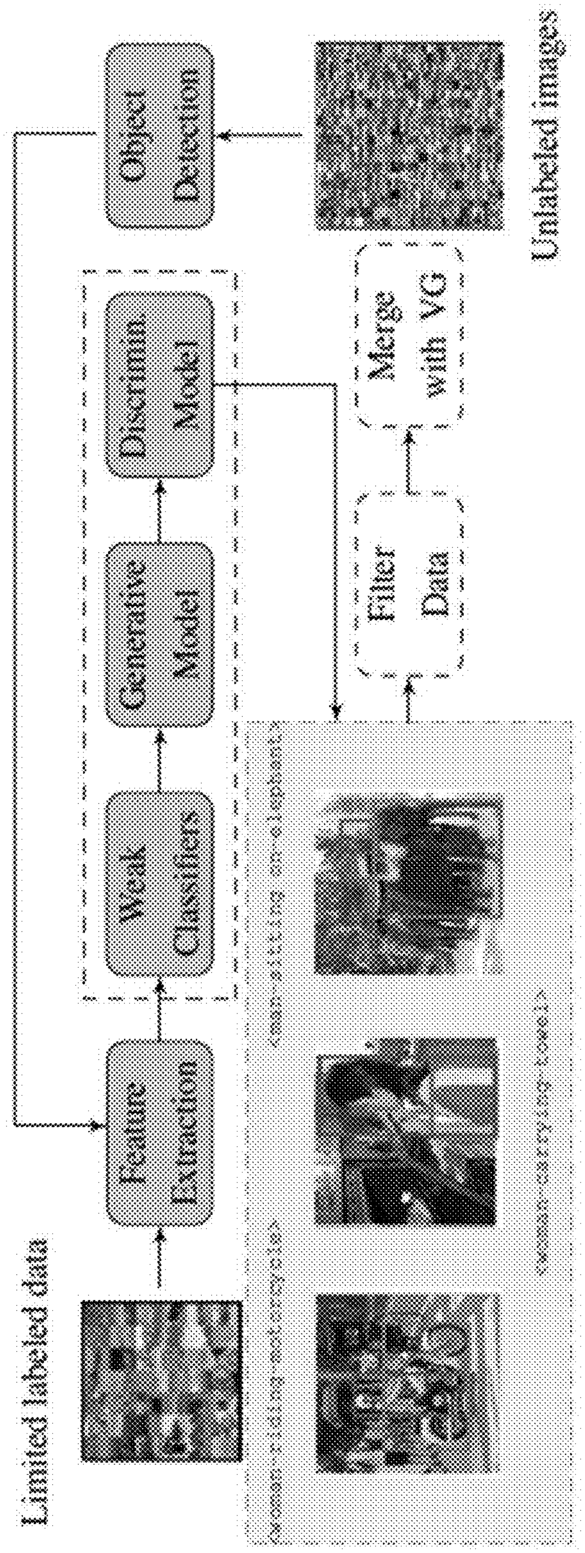
FIG. 12 illustrates components of the AI device 100 implementing a data programming (DP) approach for harvesting labeled data from unlabeled data sources, according to an embodiment of the present invention.

According to an another embodiment, the AI device 100 can implement a data programming (DP) pipeline to automatically generate new triplet training samples from unlabeled image sources (e.g., see FIG. 12).

FIG. 12 shows an example data programming (DP) approach for harvesting labeled data from unlabeled data sources.

According to an embodiment, the AI device 100 implementing a data programming (DP) pipeline can include an object detection model (e.g., object detector), a feature extraction block (e.g., feature extractor), a group of weak classifiers (e.g., labelers), a generative model, and a discrimination model. Also, the AI device 100 can further include a filter module and merge module for selecting annotated training samples that corresponds to tail categories, examples of which are discussed above.

In addition, the weak classifiers (e.g., labelers), the generative model, and the discrimination model can be collectively referred to as a "refined predictive labeling engine" or a "weakly supervised label learning platform," in which the final output is predicted labels for bounding boxes corresponding to objects and predicates found in the image. Also, to put it more succinctly, the weak classifiers, the generative model, and the discrimination model can be collectively referred to as a "label generator."

According to an embodiment, the weak classifiers can receive three different vectors as an input, which are the outputs from the feature extraction model (e.g., feature extractor), which is described in more detail below.

Further, the weak classifiers can be labeling functions (LFs) that use simple rules, patterns or heuristics, and/or combinations thereof. According to an embodiment, the weak classifiers can be decision trees (DTs) that receive the input vectors and generate a label for a corresponding bounding box or object.

The weak classifiers may not always be accurate, but their predictions are still helpful (e.g., their predictions may be noisy or vague). In other words, the weak classifiers can provide noisy labels that are still helpful, even if they are not always accurate.

Then, the generative model receives and aggregates the labels (hints) produced from the weak classifiers and estimates the most likely true labels for each object. For example, the generative model generates a predicted label for the object based on the multiple labels (hints) aggregated from the weak classifiers. Thus, the generative model outputs a set of probabilistic training labels.

In addition, the generative model can also consider how often each weak classifier is right or wrong. The generative model can also be referred to as a "detector" or "detective model."

Further in this example, the discriminative model can determine how sure the generative model is about its predicted labels. The discriminative model can be noise aware and learn from the true underlying patterns even with imperfect data.

According to an embodiment, the discriminative model can be a deep neural network that is trained by the generative model. For example, the generative model can infer probabilities over the unknown labels of the training data, which can then be used to minimize the expected loss of the discriminative model with respect to these probabilities.

Referring back to the data programming (DP) pipeline in FIG. 12, the system is initially trained on a limited set of labeled training data, such as a small set of annotated images that include information about the bounding boxes and labels for triplets (<subject, predicate, object>). This limited set of labeled training data is run through the feature extraction model (e.g., feature extractor) and used train the weak classifiers (e.g., labelers), the generative model, and the discrimination model, which can be collectively referred to as a "label generator."

Also, the final output of the label generator is predicted labels for bounding boxes corresponding to objects and predicates found in the image. For example, using the limited set of labeled training data, the system can learn from differences between its predicted labels and the actual labels (e.g., ground truth labels), in order to train itself and learn.

After being trained based on limited labeled training data, the data programming (DP) pipeline is ready to receive unlabeled images and start harvesting labeled training data from unlabeled sources.

With reference to FIG. 12, the object detection model (e.g., object detector) receives the unlabeled input images and outputs bounding boxes and class labels for entities found in the images. Various examples of the object detector are described above with regards to the caption-based (CB) pipeline and are not repeated here.

Figure 13:
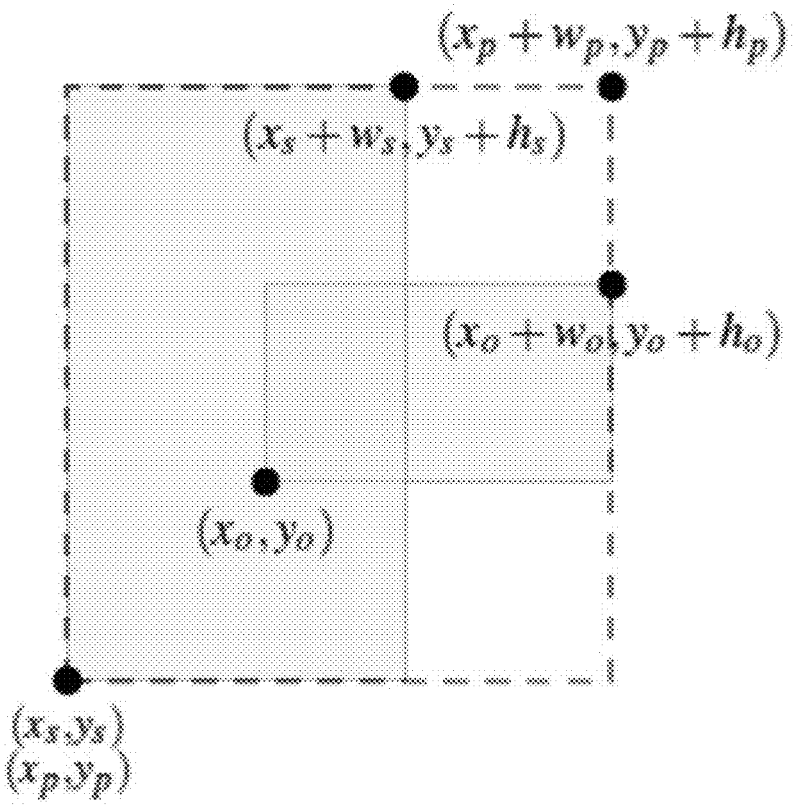
FIG. 13 illustrates bounding box for a predicate, according to an embodiment of the present invention.

Also, as shown in FIG. 13, a bounding box for a predicate can be calculated based on the bounding box of a subject and the bounding box of an object. For example, the predicate bounding box is a box that fully encloses the bounding box of the subject and the bounding box of the object.

Coordinates of the subject (e.g., s), object (e.g., o) and predicate (e.g., p) are shown in FIG. 13, which can be used in the spatial features discussed in more detail below with regards to the feature extraction model (e.g., feature extractor).

Then, images, bounding boxes and class labels from the object detector are input to the feature extraction model.

According to an embodiment, the feature extraction model outputs three different vectors (e.g., a spatial vector, a semantic vector, and a visual vector) which can produce more accurate results and improved recall rates, but embodiments are not limited thereto. For example, the feature extraction model output one or two of the three different vectors, such as the spatial vector and the semantic vector, or different combinations thereof.

According to an embodiment, the feature extraction model can implement Algorithm 3, shown below, for producing the three different vectors.

[Algorithm 3]
Algorithm 3; Feature Engineering- DP pipeline

Data: I, $b_s$, $b_o \in B_I$, $c_s$, $c_o \in C$, OD; /* input image, bboxes, labels, OD model */
Result: $f_{spatial}$; $f_{semantic}$, $f_{visual}$; /* extracted features */

1 $d(b_1, b_2) = \left(\frac{x_1 - x_2}{w_2}, \frac{y_1 - y_2}{h_2}, \log \frac{w_1}{w_2}, \log h_1 \times h_2\right)$; /* $b_i$ = (x, y, w, h) */

2 $r(b) = \left(\frac{x}{W}, \frac{y}{H}, \frac{x + w}{W}, \frac{y}{H}, \frac{w}{WH}\right)$; /* I is of the size (W, H) */

3 $b_p$ = enclosingBbox($b_s$, $b_o$); /* predicate bbox: ($x_p$, $y_p$, $w_p$, $h_p$) */
4 $f_{spatial}$ = (d($b_s$, $b_o$), d($b_s$, $b_p$), d($b_p$, $b_o$), r($b_s$), r($b_o$));
5 $f_{semantic}$ = concat (GloVe($c_S$), GloVe($c_O$))
6 $f_{visual}$ = OD ($b_p$): /* OD's backbone ConvNet followed by ROI align */
7 return $f_{spatial}$, $f_{semantic}$, $f_{visual}$ As shown above, the feature extraction process (e.g., Algorithm 3) can receive inputs including an input image, bounding boxes for the subject and the object, labels for the subject and the object, and the object detector model. Also, the feature extraction process outputs the three vectors (e.g., $f_{spatial}$, $f_{semantic}$, $f_{visual}$) which are input to the weak classifiers of the label generator.

In line 1 of Algorithm 3, a vector d is calculated which has four elements, in which the vector represents relationships between two bounding boxes (e.g., b1, b2), which can be two bounding boxes selected from among the object's bounding box, the subject's bounding box and the predicate's bounding box. Vector d is calculated for different pairs of bounding boxes for determining $f_{spatial}$, discussed in more detail below.

Further in this example, in line 2, a vector r is calculated which has five elements, in which the vector represents relationships regarding where a given bounding box is located with respect to the image. Vector r is also used for calculating portions of $f_{spatial}$, discussed in more detail below.

In addition, line 3 of Algorithm 3 calculates the bounding box for the predicate, which is a bounding box enclosing the bounding boxes of the subject and the object (e.g., see the large, dashed box in FIG. 13).

With reference to line 4 of Algorithm 3, the equations in lines 1-3 are used to calculate the $f_{spatial}$ vector, which is a 22 dimensional vector.

In line 5 of Algorithm 3, the $f_{semantic}$ vector is calculated, which is the concatenation of two, 100-dimensinal GloVE embeddings of the subject label (e.g., $c_s$) and the object label (e.g., $c_o$), which are the labels that were obtained by the object detector. Thus, the size of the semantic feature (e.g., $f_{semantic}$) is a 200-dimensional vector.

Further in this example, in line 6, the visual features (e.g., $f_{visual}$ vector) are calculated, which is the 1024-dimensional features of the object detector's ConvNet backbone followed by an ROI-align. For example, the ConvNet backbone can summarize the entire image for context and the ROI-align can extract accurate features from potential object locations, in order to extract relevant features for further processing (e.g., for input to the label generator).

Once the three vectors $f_{spatial}$, $f_{semantic}$, and $f_{visual}$ are calculated, they can be input to the weak classifiers of the label generator. Then the label generator can use these three vectors to create label annotations for the unlabeled input images.

The final output of the label generator can be a training sample that includes the input image annotated with bounding boxes overlaid on it and includes triplets (e.g., subject, predicate, object) each indicating a relationship between two entities in the image.

In addition, in FIG. 12, the filter can receive these generated training samples and select only those training samples that have predicates that are located in the tail categories (e.g., n<5,000 samples), and the other samples that fall within the head and body can be discarded, but embodiments are not limited thereto. According to another embodiment, the filtering step can be adjusted or omitted, and some or all of the harvested training samples that belong to the head and body categories can be added to the base dataset or used to create a new training dataset.

The filtered training samples selected from among the harvested training samples can be converted to the same format as the base dataset and merged together with the base dataset, in order to produce an enhanced dataset that has an improved tail distribution.

Figure 14A:
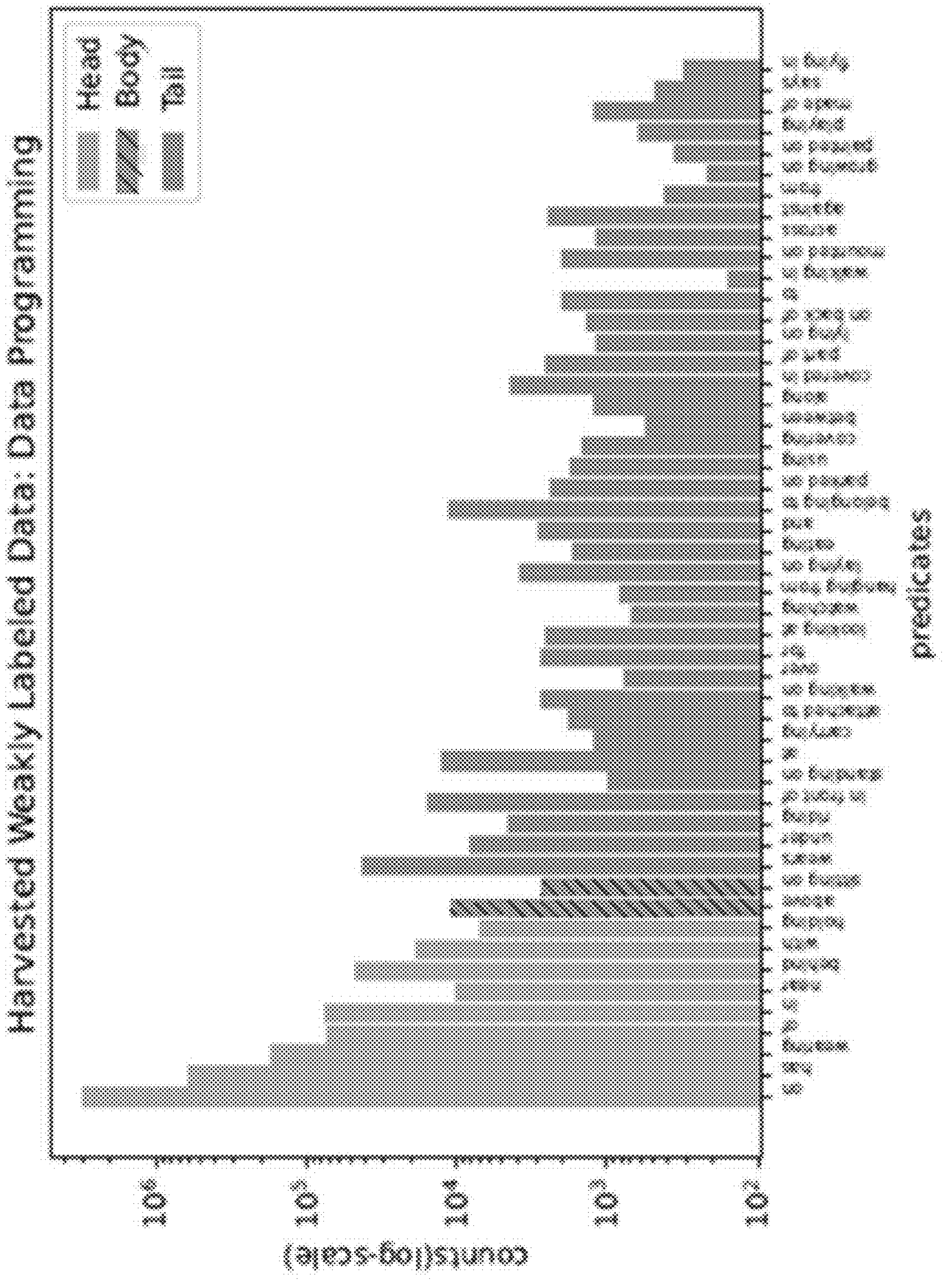
FIG. 14A illustrates example statistics of the harvested training data samples according to the data-programming (DP) approach, according to an embodiment of the present invention.
Figure 14B:
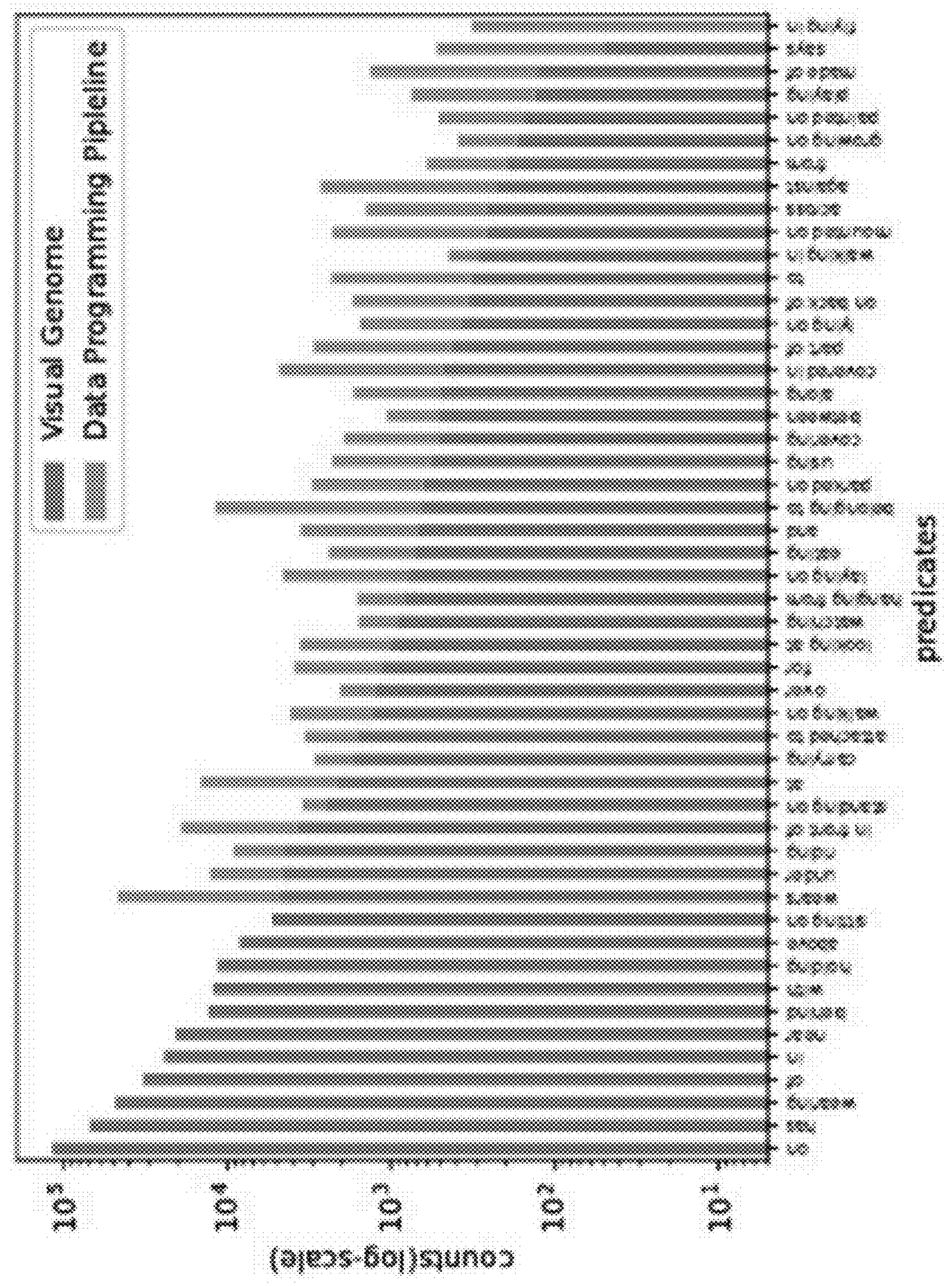
FIG. 14B illustrates example statistics of training data samples from the DP approach merged with the base dataset which have been added to the tail categories to generate an enhanced dataset, according to an embodiment of the present invention.

For example FIG. 14A shows example statistics of the harvested data according to the data-programming (DP) approach, and FIG. 14B shows an example of those training samples merged with the base dataset which have been added to the tail categories to generate an enhanced dataset. In this way, the data-programming (DP) approach can automatically generate new triplet training samples from unlabeled image sources in a manner that saves time and reduces costs. Also, the newly harvested training samples can be filtered and added to the tail categories to generate an enhanced dataset, which can improve recall rates and accuracy.

According to another embodiment, the AI device 100 can implement both the caption-based (CB) pipeline (e.g., FIG. 7) and the data-programming (DP) pipeline (e.g., FIG. 12), in which the two different sets of harvested labeled training data can be filtered and merged with the original dataset (e.g., VG+CB+DP), in order to even further enhance the tail distribution.

FIG. 15 shows example harvested triplets of images according to the caption-based (CB) approach on the left, and example harvested triplets of images according to the data-programming (DP) approach are shown on the right.

The data-programming (DP) approach can produce dense scene graphs, whereas the caption-based (CB) approach can produce sparse scene graphs but has higher quality data in terms of containing the key relationships between key objects in the image. Also, as shown in FIG. 11A and FIG. 14A, the data-programming (DP) approach can produce training samples that follow a similar distribution as the original base dataset, while the caption-based (CB) approach can produce training samples that are more evenly spaced out and may include more samples for rare predicates in the tail.

For example, each of the caption-based (CB) approach and the data-programming (DP) approach has its own strengths and weaknesses. Thus, combining the two approaches can nicely complement each other to even further enhance the tail distribution (e.g., VG+CB+DP), but embodiments are not limited thereto.

According to an embodiment, the AI device 100 can used the enhanced dataset to train a scene graph generation model. The trained scene graph generation model can be used for various applications, such as computer vision applications (e.g., self-driving, surveillance, robot guidance, etc.), question and answering systems or recommendations systems.

According to an embodiment, the AI device 100 can include one or more knowledge graphs that include entities and properties or information about images, videos, people or items (e.g., names, user IDs), products (e.g., display devices, home appliances, etc.), profile information (e.g., age, gender, weight, location, etc.), recipe categories, ingredients, images, purchases and reviews. Also, the trained scene graph generation model can be used for answering user questions or providing recommendations.

According to an embodiment, the AI device 100 can be configured to answer user queries and/or recommend items (e.g., home appliance devices, mobile electronic devices, movies, content, advertisements or display devices, etc.), options or routes to a user. The AI device 100 can be used in various types of different situations.

According to one or more embodiments of the present disclosure, the AI device 100 can solve one or more technological problems in the existing technology, such as harvesting training data from unlabeled sources for improving scene graph generation and related downstream tasks, in a manner which can save time and reduce costs, and also improve recall rates and accuracy of models.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for controlling an artificial intelligence (AI) device, the method comprising:

receiving, via a processor in the AI device, a base dataset;

receiving, via the processor, an image being unlabeled;

inputting, via the processor, the image to at least one of a caption-based pipeline and a data programming pipeline to generate a labeled image training data sample including triplet information comprising a predicate, the caption-based pipeline including a matching model configured to receive textual scene graph information for the image and bounding box information for the image, and the data programming pipeline including a feature extraction model configured to output three vectors and a label generator configured to receive the three vectors; and in response to the predicate matching a same predicate in a tail distribution of the base dataset, merging, via the processor, the labeled image training data sample with the base dataset to generate an enhanced dataset.

2. The method of claim 1, further comprising:

in response to the predicate being different than all predicates in the tail distribution of the base dataset, discarding the labeled image training data sample.

3. The method of claim 1, further comprising:

training, via the processor, a scene graph generation model based on the enhanced dataset to generate a trained scene graph generation model, wherein the trained scene graph generation model includes at least one trained neural network that is trained based on the enhanced dataset.

4. The method of claim 1, further comprising:

inputting the image to an image captioning model in the caption-based pipeline;

outputting, via the image captioning model, a sentence corresponding to a caption for the image;

inputting the sentence to a textual scene graph generation (SGG) model in the caption-based pipeline;

outputting, via the SGG model, textual scene graph information for the sentence corresponding to the image;

inputting the image to an object detector in the caption-based pipeline;

outputting, via the object detector, bounding box information and label information for the image;

inputting the textual scene graph information, the bounding box information and the label information to a matching model; and matching or converting, via the matching model, a word within at least one of the textual scene graph information, the bounding box information and the label information to a same word included in a vocabulary of the base dataset for generating the labeled image training data sample.

5. The method of claim 4, wherein the matching model uses a first algorithm for matching or converting predicates within the at least one of the textual scene graph information, the bounding box information and the label information to correspond to predicates found in the base dataset, and wherein the matching model uses a second algorithm for matching or converting objects within the at least one of the textual scene graph information, the bounding box information and the label information to correspond to objects found in the base dataset, the second algorithm being different than the first algorithm.

6. The method of claim 4, wherein the textual scene graph information includes nodes corresponding objects in the image and edges corresponding to relationships between the objects in the image.

7. The method of claim 4, wherein the image captioning model is a pre-trained Meshed-Memory Transformer.

8. The method of claim 4, wherein the object detector is a pre-trained Mask Region-based Convolutional Neural Network (Mask R-CNN).

9. The method of claim 1, wherein the tail distribution of the base dataset includes tail predicates, each of the tail predicates corresponding to a number of training samples that is less than a predetermined number.

10. The method of claim 1, further comprising:

inputting the image to an object detector in the data programming pipeline;

outputting, via the object detector, bounding box information and label information for the image;

inputting the bounding box information and the label information to the feature extraction model; and outputting, via the feature extraction model, a spatial vector, a semantic vector and a visual vector.

11. The method of claim 10, further comprising:

inputting the spatial vector, the semantic vector and the visual vector to the label generator in the data programming pipeline; and outputting, via the label generator, the labeled image training data sample based on the spatial vector, the semantic vector and the visual vector.

12. The method of claim 11, wherein the label generator includes a group of weak classifiers configured to output labels for objects included in the image, a generative model configured to output a set of probabilistic training labels, and a discriminative model configured to output the labeled image training data sample based on the set of probabilistic training labels.

13. The method of claim 11, wherein the spatial vector is generated based on a bounding box of a subject in the image, a bounding box of an object in the image, and a bounding box of a predicate that encloses the bounding box of the subject and the bounding box of the object, wherein the semantic vector is generated based on a concatenation of two multi-dimensional embeddings of a label of the subject and a label of the object, and wherein the visual vector is generated based on a convolutional neural network backbone (ConvNet) of the object detector followed by region of interest (ROI) align.

14. An artificial intelligence (AI) device for harvesting labeled training data from unlabeled sources, the AI device comprising:

a memory configured to store a base dataset; and a controller configured to:

receive an image being unlabeled, input the image to at least one of a caption-based pipeline and a data programming pipeline to generate a labeled image training data sample including triplet information comprising a predicate, the caption-based pipeline including a matching model configured to receive textual scene graph information for the image and bounding box information for the image, and the data programming pipeline including a feature extraction model configured to output three vectors and a label generator configured to receive the three vectors, and in response to the predicate matching a same predicate in a tail distribution of the base dataset, merge the labeled image training data sample with the base dataset to generate an enhanced dataset.

15. The AI device of claim 14, wherein the controller is further configured to:

input the image to an image captioning model in the caption-based pipeline, output, via the image captioning model, a sentence corresponding to a caption for the image, input the sentence to a textual scene graph generation (SGG) model in the caption-based pipeline, output, via the SGG model, textual scene graph information for the sentence corresponding to the image, input the image to an object detector in the caption-based pipeline, output, via the object detector, bounding box information and label information for the image, input the textual scene graph information, the bounding box information and the label information to a matching model, and match or convert, via the matching model, a word within at least one of the textual scene graph information, the bounding box information and the label information to a same word included in a vocabulary of the base dataset to generate the labeled image training data sample.

16. The AI device of claim 15, wherein the matching model uses a first algorithm for matching or converting predicates within the at least one of the textual scene graph information, the bounding box information and the label information to correspond to predicates found in the base dataset, and wherein the matching model uses a second algorithm for matching or converting objects within the at least one of the textual scene graph information, the bounding box information and the label information to correspond to objects found in the base dataset, the second algorithm being different than the first algorithm.

17. The AI device of claim 14, wherein the controller is further configured to:

input the image to an object detector in the data programming pipeline, output, via the object detector, bounding box information and label information for the image, input the bounding box information and the label information to the feature extraction model, and output, via the feature extraction model, a spatial vector, a semantic vector and a visual vector.

18. The AI device of claim 17, wherein the controller is further configured to:

input the spatial vector, the semantic vector and the visual vector to the label generator in the data programming pipeline, and output, via the label generator, the labeled image training data sample based on the spatial vector, the semantic vector and the visual vector.

19. The AI device of claim 18, wherein the label generator includes a group of weak classifiers configured to output labels for objects included in the image, a generative model configured to output a set of probabilistic training labels, and a discriminative model configured to output the labeled image training data sample based on the set of probabilistic training labels.

20. The AI device of claim 18, wherein the spatial vector is generated based on a bounding box of a subject in the image, a bounding box of an object in the image, and a bounding box of a predicate that encloses the bounding box of the subject and the bounding box of the object, wherein the semantic vector is generated based on a concatenation of two multi-dimensional embeddings of a label of the subject and a label of the object, and wherein the visual vector is generated based on a convolutional neural network backbone (ConvNet) of the object detector followed by region of interest (ROI) align.

21. The AI device of claim 14, wherein the controller is further configured to:

in response to the predicate being different than all predicates in the tail distribution of the base dataset, discard the labeled image training data sample.

22. The AI device of claim 14, wherein the controller is further configured to:

train a scene graph generation model based on the enhanced dataset to generate a trained scene graph generation model, and wherein the trained scene graph generation model includes at least one trained neural network that is trained based on the enhanced dataset.

23. The AI device of claim 14, wherein the tail distribution of the base dataset includes tail predicates, each of the tail predicates corresponding to a number of training samples that is less than a predetermined number.

* * * * *